United States Patent [19]
Reinert, Sr.

[11] Patent Number: 5,582,477
[45] Date of Patent: Dec. 10, 1996

[54] FINNED CONTAINER BASES

[76] Inventor: Gary L. Reinert, Sr., 4319 Middle Rd., Allison Park, Pa. 15101

[21] Appl. No.: 403,065

[22] Filed: Mar. 13, 1995

[51] Int. Cl.$^6$ ........................................ E01F 9/00
[52] U.S. Cl. ...................... 362/153.1; 362/431; 362/812; 174/38; 248/545; 40/565
[58] Field of Search ........................ 174/37, 38; 248/545; 362/145, 152, 153.1, 431, 812; 40/541, 565, 612

[56] References Cited

U.S. PATENT DOCUMENTS

| | | | |
|---|---|---|---|
| D. 204,269 | 4/1966 | Naudus | D26/5 |
| 367,411 | 8/1887 | Kilmer | 52/154 |
| 612,052 | 10/1898 | McMullen | 52/154 |
| 1,004,112 | 9/1911 | Upchurch . | |
| 1,611,935 | 12/1926 | Mitchell | 52/297 X |
| 1,667,970 | 5/1928 | Herrmann . | |
| 3,011,598 | 12/1961 | Galloway et al. | 189/30 |
| 3,015,720 | 1/1962 | Silverman | 240/25 |
| 3,263,853 | 8/1966 | Smith | 220/18 |
| 3,342,444 | 9/1965 | Nelson | 248/156 |
| 3,345,040 | 10/1967 | Rivelli | 256/37 |
| 3,466,380 | 9/1969 | Baumgartner et al. | 174/38 |
| 3,519,726 | 7/1970 | Ewing | 174/37 |
| 3,805,055 | 4/1974 | Cassey | 240/84 |
| 3,969,853 | 7/1976 | Deike | 52/156 |
| 4,269,010 | 5/1981 | Glass | 52/154 |
| 4,346,254 | 8/1982 | Borin et al. | 174/37 |
| 4,507,715 | 3/1985 | Wedding | 362/153 |
| 4,801,128 | 1/1989 | Taylor | 256/68 |
| 4,858,877 | 8/1989 | Carter | 248/545 |
| 5,029,054 | 7/1991 | Trainor | 362/153.1 |
| 5,055,984 | 10/1991 | Hung et al. | 362/183 |
| 5,082,231 | 1/1992 | Knowles | 248/545 |
| 5,297,013 | 3/1994 | Hall et al. | 362/363 |

*Primary Examiner*—Stephen F. Husar
*Attorney, Agent, or Firm*—Douglas G. Glantz

[57] ABSTRACT

Finned airport junction box container base apparatus and associated installation method are disclosed for an airport edge lighting fixture or an airport sign in an airport runway, taxiway, or other aircraft ground traffic area. Vertical finned vanes are welded to the side of an airport junction box container base spaced apart around the circumference and extending radially outward for providing lateral stability and strength to the junction box to permit push-it installation and to support loads. A bottom edge on the finned vanes extends radially outward from the container base positioned at a penetrating angle from the horizontal to the junction box base bottom end for penetrating earthen or asphalt material when pushed downwardly. A top edge on the vertical fins extends downwardly from a welded point underneath the top flange, wherein the junction box is reusable by removal and reinstallation at another location. In one aspect, the finned apparatus and method of the present invention include installation by a Push-It Machine mobile push-it and installation apparatus and method to provide advantages of efficiency and productivity for installing the finned junction box or container base into the ground or asphalt.

20 Claims, 9 Drawing Sheets

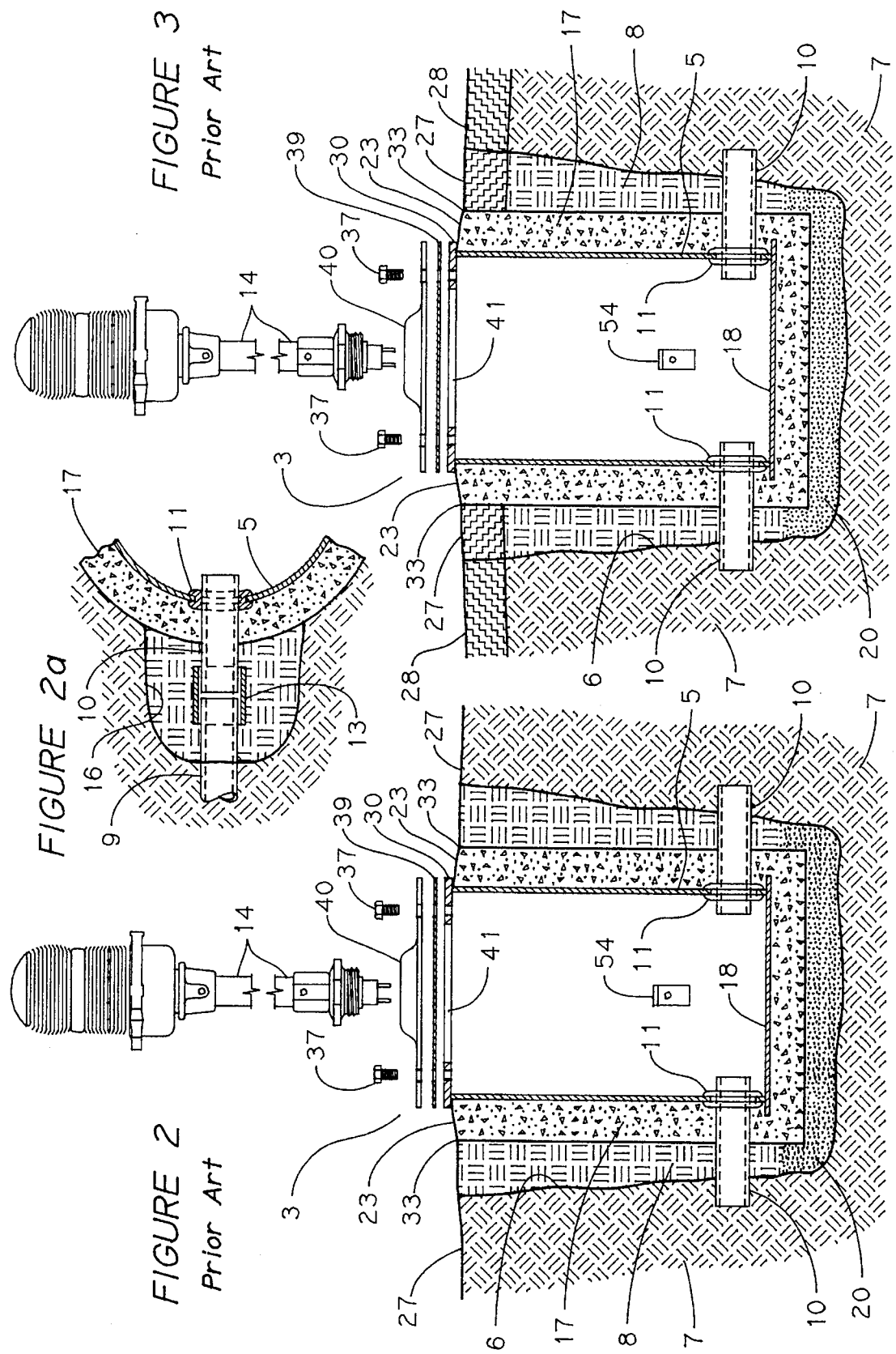

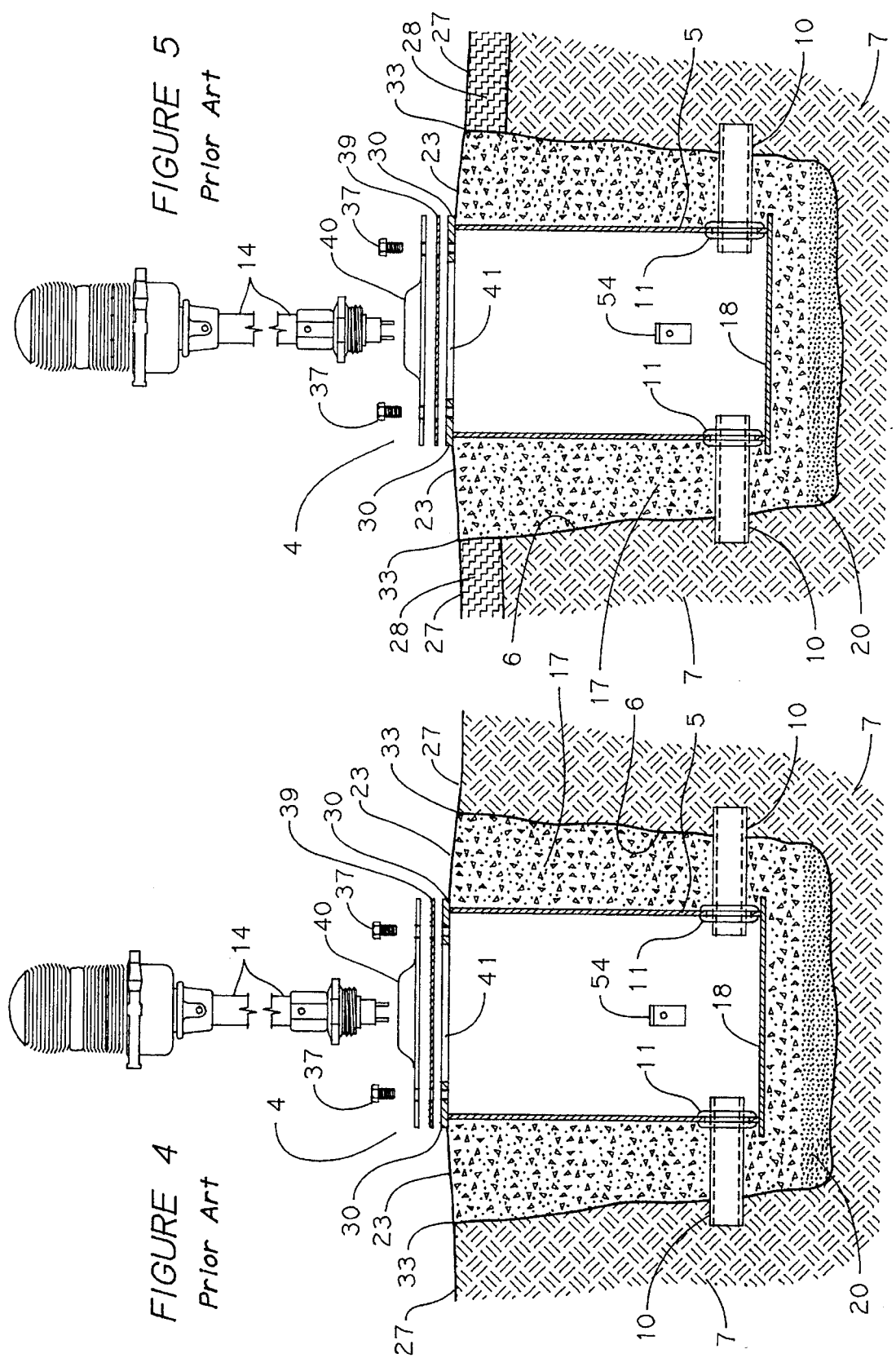

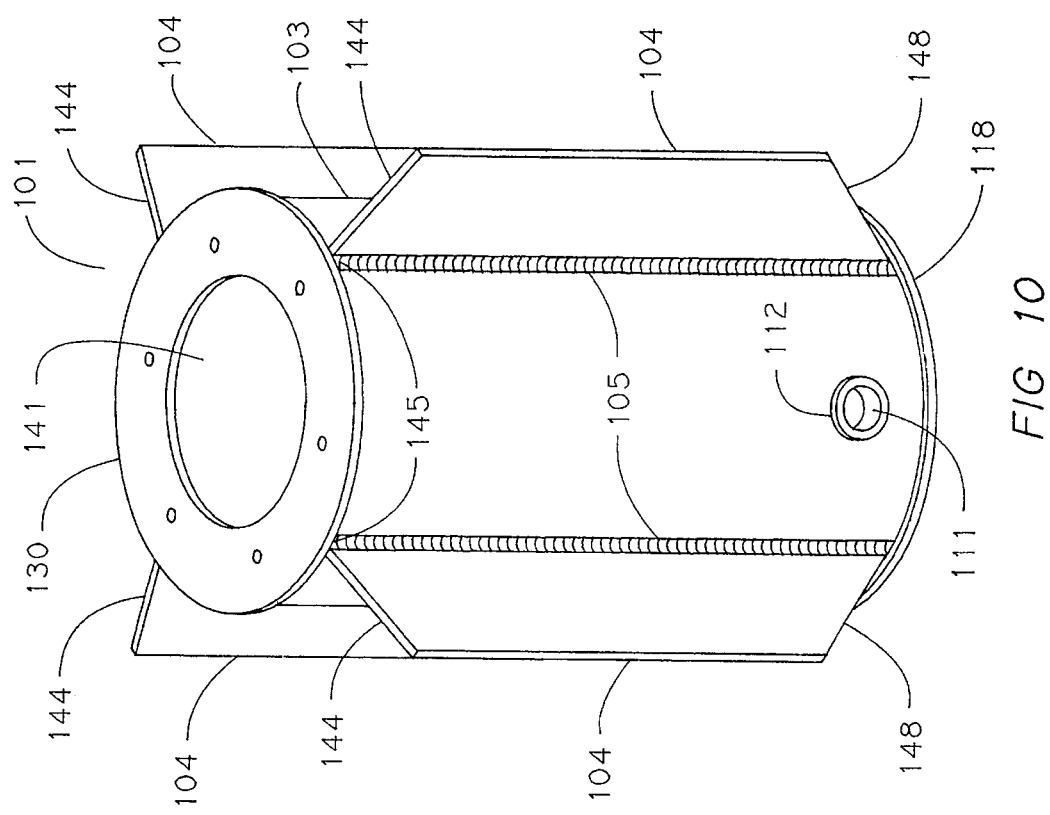
FIG. 10
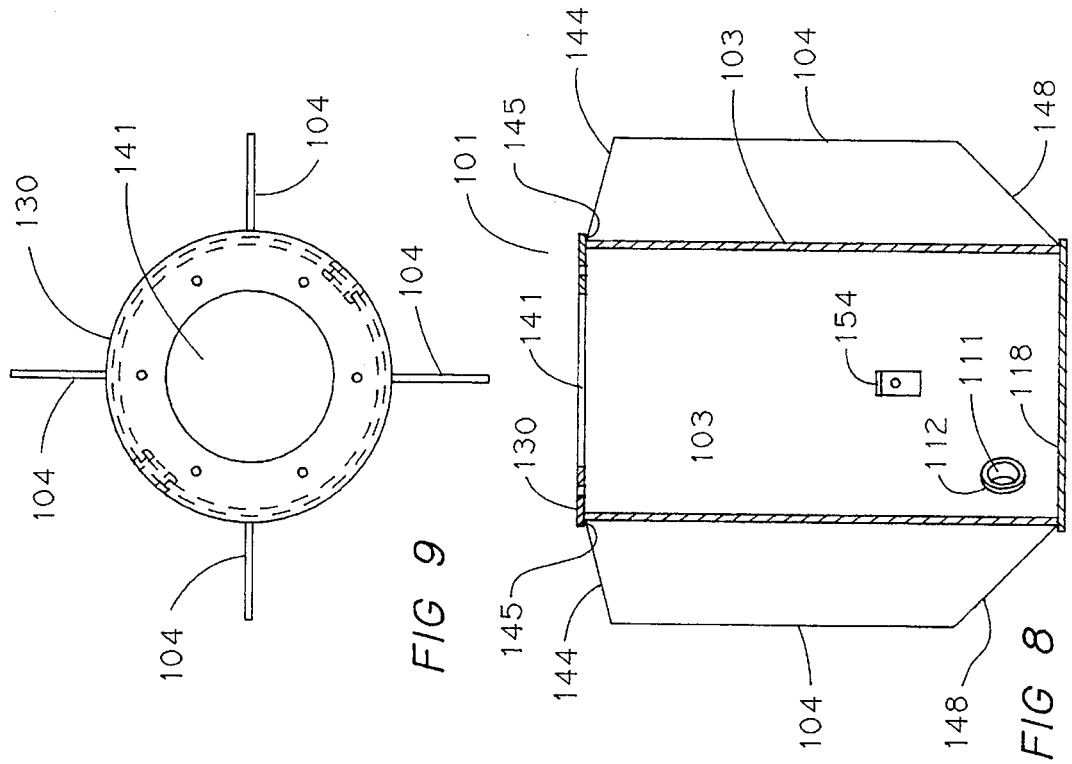
FIG. 9
FIG. 8

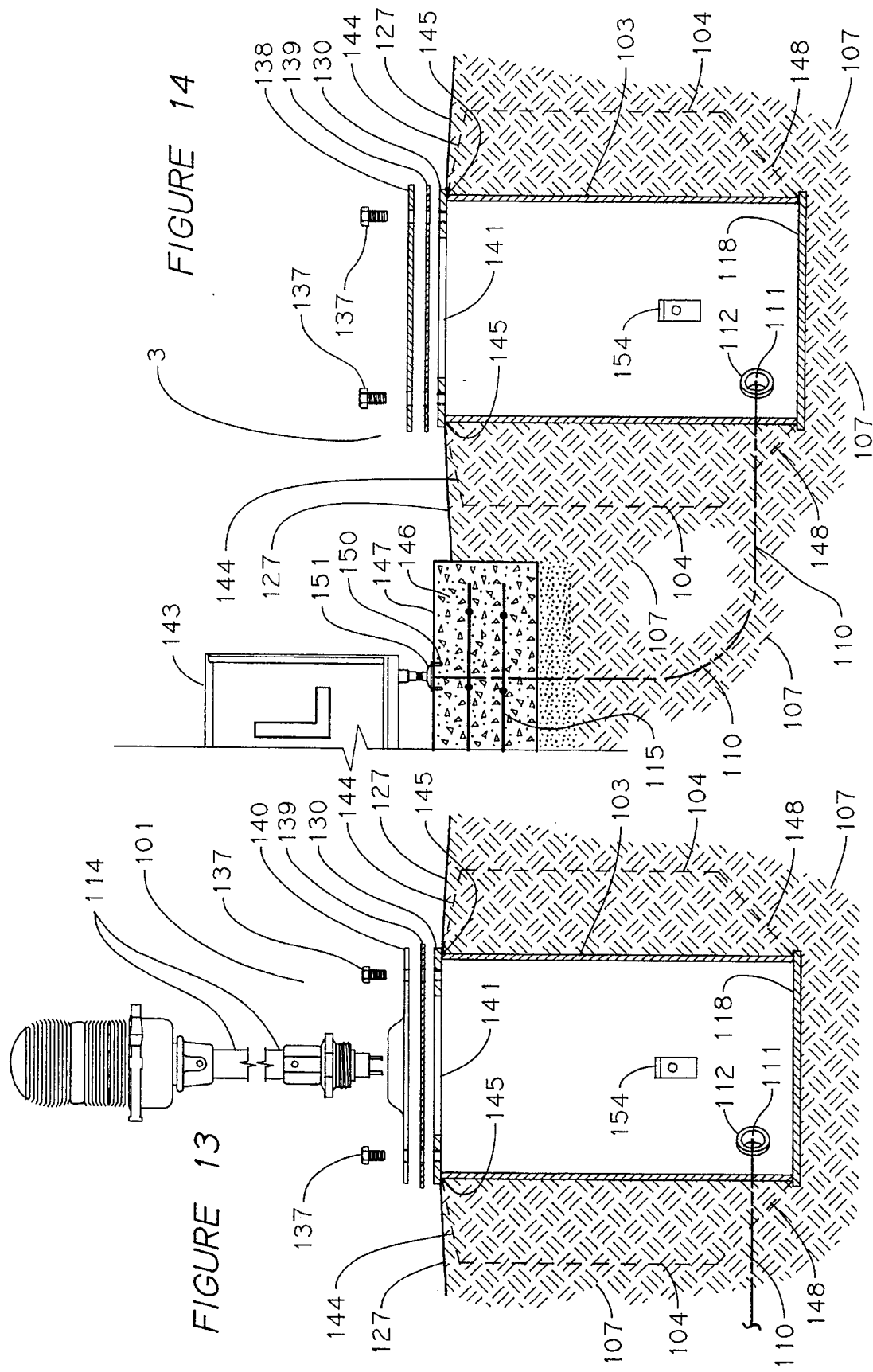

FINNED CONTAINER BASES

BACKGROUND OF THE INVENTION

1. Technical Field

This invention relates to electrical junction box container apparatus and associated methods for providing and installing embedded container base junction box/light supports and sign junction boxes. In one aspect, the invention relates to container base apparatus and installation methods for specialized airport edge lighting systems and signs used for the purpose of guiding pilots on an airport runway and during the taxi of aircraft.

2. Background

Conventional edge lighting fixtures forming part of specialized airport edge lighting systems are mounted on containers and associated elements of hardware which also can be viewed as canister set apparatus. The bottom sections of the containers are sometimes called container bases, e.g., edge light container bases. The container bases for these airport edge lights are set along the edge of runways, taxiways, and other aircraft ground traffic areas. The top sections are manufactured in different fixed lengths and diameters. These conventional canisters or container bases and associated elements of hardware, in addition to serving as apparatus for mounting the edge lighting fixtures, also serve as transformer housings and junction boxes to bring electrical power to edge lighting fixtures and to airport signs.

In the installation and support of airport runway edge lighting systems, as well as in the construction or installation and support of taxiway edge lighting systems, and other airport runway lighting systems, the container bases are embedded in the ground, typically alongside of the runway, taxiway, and other pavements. These containers vary in length and diameter. The conventional, existing art containers provide means at their top portion to allow for the runway, taxiway, edge, and other light fixtures to be bolted onto them above the surface, or to allow for the top section of the container to be bolted onto the container bottom section, if it is a two-section container. Each airport paving project may consist of installing hundreds or more edge lighting fixtures and their airport edge light container bases.

Containers used as mounting bases for airport edge lights are generally designated in FAA specification #AC 150/5345-42 as type L-867 Class I. They are designed to withstand light vehicular loads and are subject to direct earth burial with or without concrete encasement. Project design engineers specify whether to use concrete to encase the containers or to bury them directly in the soil. The concrete-encased containers are the most frequently installed, and concrete encasement is considered standard practice.

In the description of conventional containers and their installation, conventional containers can be pre-cast in concrete and then buried in an earthen hole. The conventional containers also can be cast-in-place or can be buried directly without any concrete around the container.

FAA specification #AC 150/5345-42 does not mandate one way or the other, but it is common practice to utilize concrete-encased containers. It generally is specified by the project design engineer to utilize concrete-encased containers, whether pre-cast or cast-in-place. The concrete is placed around the container mainly for stability to withstand overturning and for securely anchoring the container to the earth. Both the pre-cast and the cast-in-place containers can be installed in paved as well as non-paved areas.

Since one of the purposes for the installation of these containers is to use them as electrical junction boxes, it is common practice at the time the containers are first installed to cut a trench approximately four inches wide, using a Vermeer or similar equipment, along the entire length of the installation parallel to the runway or taxiway. The trench is cut in the ground or in the asphalt shoulder before installing the containers and is used for laying conduit, generally plastic type, which is used for bringing electrical power cables to each junction box in the system.

A relatively large hole must be dug in the ground or in the pavement shoulder of an airport runway or taxiway. When the airport edge lighting system is installed for the first time, the bottom sections of the conventional containers are set in the ground in holes considerably larger than the container's bottom sections. The conventional container then can be placed/buried in the earthen hole.

The electrical contractor installs an isolation transformer inside the containers together with electrical wires and wiring devices required for powering airport edge lights and airport signs. Such installation typically is done through an opening at the top of the container. These containers are generally provided with a grounding lug.

Electrical conduit is installed in trenches in the ground and fastened to the containers. Electrical wires are pulled through and into each container. The trenches then are filled around the containers to encase and anchor them in the ground.

Hall et al., U.S. Pat. No. 5,297,013, disclose an outdoor light fixture on an underground anchor stake. Electrical wire for providing power to the light is run down the stake through a stake channel until the wire is below ground.

Knowles, U.S. Pat. No. 5,082,231, discloses a sign support including a post-receiving collar affixed to fins.

Trainor, U.S. Pat. No. 5,029,054, discloses a light base and transformer housing for an airport light comprising a unitary housing made from a noncorrosive material provided with external vertically extending fluted indentations so that the housing will have greater compressive strength and will resist movement in the ground when installed therein and after concrete or bitumen has been poured around the housing.

Carter, U.S. Pat. No. 4,858,877, discloses an outdoor light fixture on an underground nonconductive plastic pipe with an end for receiving electrical conductors or electrical conduit. Stabilizer plates are secured to the pipe in the ground for stabilizing the pipe to prevent the pipe from moving.

Trainor et al., U.S. Pat. No. 4,622,435, disclose an adjustable light base and transformer housing for a runway light to be embedded in an airport runway when the runway pavement is constructed for the first time. In installing the adjustable light base and transformer housing, the cylinder is placed in a previously dug hole on compacted subsoil in the usual fashion (Col. 2, lines 49–51).

Cassey, U.S. Pat. No. 3,805,055, discloses a removable outdoor light having a base member with fins installed in the earth and having electric contacts for making electrical connection with a removable electric post light.

Ewing, U.S. Pat. No. 3,519,726, discloses a transformer vault for underground installation and apertures to permit passage of electrical cables.

There are many costly problems and drawbacks associated with the utilization of conventional containers in the conventional or prior art methods. One problem is the expense involved in setting the containers in the ground in holes larger than the container's bottom sections. Another drawback is the requirement for closing up the hole after the container is placed in the ground and installed. Still another drawback of conventional apparatus and methods involves the requirement for a concrete encasement, used for its mass to provide a structural foundation for load support.

In the installation of concrete-encased canisters by the conventional methods, site layout is performed, equipment is deployed, the site is excavated, the spoils are removed, and a stone sub-base sometimes is placed in the excavated hole. The work requires a backhoe, a truck, and equipment operators and canister installers as well as one or more laborers depending on the size of the job. Materials, such as the stone for the sub-base, also are required. In the case of airport runway work, all construction debris and equipment must be removed from the work site by the end of each work day.

The concrete must be mixed, concrete pouring forms must be built, and then the concrete encasement is poured. This work requires a carpenter, a laborer, and the material, i.e., cement and gravel for the concrete, on-site water, and forms. Again, in the case of airport runway work, all construction debris and equipment must be removed from the site at the end of the work day.

Next, the forms must be stripped, and back-filling around the foundation must be performed. This work requires a backhoe, the operator, a carpenter, a laborer, and materials used to backfill and seed the area.

Conventional methods require the concrete to cure for about seven (7) days. This concrete curing sometimes takes longer depending on the type of concrete used. If testings show the concrete not to comply with a specified strength within the first seven (7) days, then it is required to wait twenty-eight (28) days before any structure can be installed upon the concrete.

In conventional methods of installation for a structure supported by a concrete encasement, some of the major drawbacks of the conventional installation method are apparent. These drawbacks include lengthy installation times and prolonged runway and taxiway closure time in the case of airports. These drawbacks further include increased labor costs, weather dependent operation, and an increased risk, attributable to the many truck trips required, of debris falling on the runway or aircraft traffic areas.

It is therefore an object of the present invention to provide apparatus and method for providing and installing an embedded container junction box with efficiency, simplicity, and precision.

It is a further object of the present invention to provide apparatus and method for providing and installing an embedded container with efficiency, simplicity, and precision together with a lighting fixture installed upon the embedded container apparatus of the present invention.

It is yet another object of the present invention to provide apparatus and method for installing a container base in the ground without the need for digging holes larger than the container's bottom sections.

Another object of the present invention is to provide apparatus and method for installing a container base apparatus which provides good stability and strength in the ground capable of withstanding typical airport runway edge lighting and sign loads.

Another object of the present invention is to provide apparatus and method for installing with efficiency, simplicity, precision, and stability a container base apparatus in the ground while eliminating the need for concrete encasements around the container's bottom sections and providing good stability and strength capable of withstanding typical airport runway edge lighting and sign loads.

Still another object of the present invention is to provide apparatus and method for installing a container base apparatus which eliminate the need for digging apparatus and soil removal for setting the containers in the ground in holes larger than the container's bottom sections.

It is a still further object of the present invention to provide apparatus and method for installing with efficiency, simplicity, precision, and stability a container base apparatus and method which eliminate the problems associated with and experienced in conventional practices.

These and other objects of the present invention will be described in the detailed description of the invention which follows. These and other objects of the present invention will become apparent to those skilled in the art from a careful review of the detailed description and from reference to the figures of the drawings.

BRIEF DESCRIPTION OF THE DRAWINGS

FIG. 1 also shows an airport edge light installed upon the old art container.

FIG. 2 is an elevation view, partially in section, of a conventional (old art) pre-cast-in-concrete container installed in the ground. FIG. 2 also shows an airport edge light installed upon the prior art container.

FIG. 2a is a plan view, partially in section, showing a piece of conduit coming out of the conventional container and a connection to a conduit previously laid underground. FIG. 2a also shows a coupling and a grommet.

FIG. 3 is an elevation view, partially in section, of a conventional pre-cast-in-concrete container installed in an asphalt shoulder. FIG. 3 also shows an airport edge light installed upon the conventional container.

FIG. 4 is an elevation view, partially in section, of a conventional cast-in-place container installed in the ground. FIG. 4 also shows an airport edge light installed upon the conventional container.

FIG. 5 is an elevation view, partially in section, of a conventional cast-in-place container installed in an asphalt shoulder. FIG. 5 also shows an airport edge light installed upon the conventional container.

FIG. 6 also shows a container top cover and a gasket.

FIG. 7 also shows a container top cover and a gasket.

FIG. 8 is an elevation view, partially in section, of the finned container of the present invention.

FIG. 9 is a plan view showing the finned container top plate, top opening, bolt holes, and four fins, all in accordance with the present invention.

FIG. 10 is a perspective view of the finned container of the present invention.

FIG. 11a also shows a coupling and a grommet.

FIG. 13 is an elevation view, partially in section, of the finned container of the present invention installed directly in the ground. FIG. 13 also shows an airport edge light installed upon the finned container.

FIG. 14 is an elevation view, partially in section, of the finned container of the present invention installed directly in the ground in conjunction with an airport sign. FIG. 14 also shows a container top cover plate and a gasket.

SUMMARY OF THE INVENTION

Figures 1, 1A:
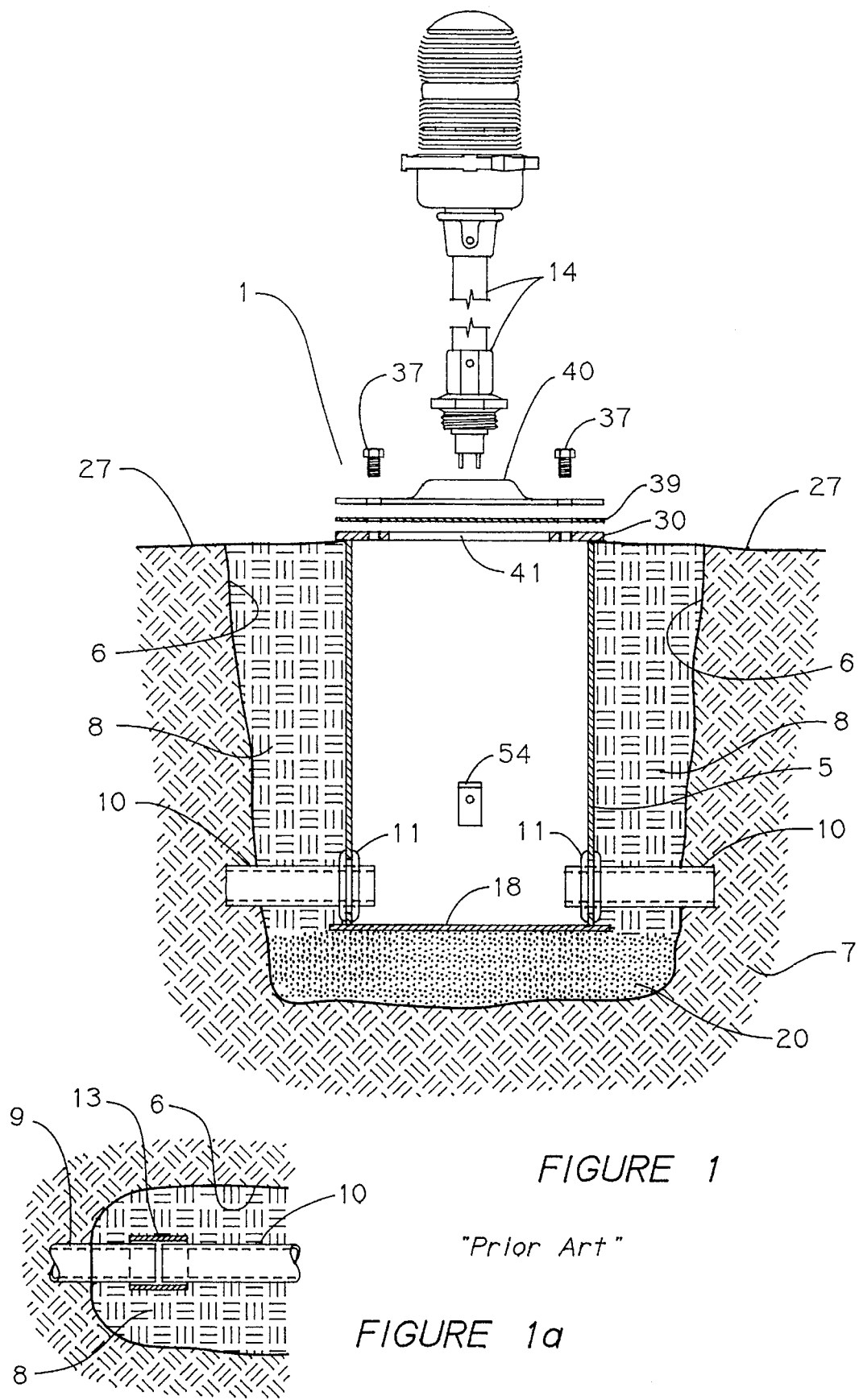
FIG. 1 is an elevation view, partially in section, of a conventional prior art container installed directly in the ground.
FIG. 1a is a plan view, partially in section, showing a conduit connection inside an earthen hole.

The finned container base apparatus and method of the present invention include the installation of an airport junction box canister for placement as a partially embedded junction box for providing electrical power to a lighting fixture or to an airport sign in an airport runway, taxiway, or other aircraft ground traffic area; vertical finned installation and support means connected to the container base, positioned parallel to the longitudinal axis of the container base, and having a plurality of finned vanes welded to the side of the container base spaced apart around the circumference of the container base and extending radially outward from the container base, e.g., preferably in one aspect, a distance of at least about one half the radius of the container base, for providing lateral stability and strength to the canister to permit push-it installation and to support loads imposed on the container in an airport runway, taxiway, or other aircraft ground traffic areas; a top flange on the canister capable of supporting an edge light or a sign junction box top cover; a top edge on the vertical finned installation and support means positioned at a downwardly extending angle to the top flange, wherein the top edge extends at an angle, e.g., of about 10°–45°, from the horizontal down from a welded point underneath the top flange and toward the side of the finned vanes extending radially outward from the container base; a bottom end surface on the container base; and a bottom edge on the finned vanes extending radially outward from the container base positioned at a penetrating angle, e.g., of at least about 40°, from the horizontal to the container base bottom end for penetrating earthen or asphalt material when pushed downwardly; wherein the canister is reusable by removal and reinstallation at another location.

In one aspect, the finned container base assembly apparatus and method of the present invention include finned base installation by a Push-It Machine mobile push-it and installation apparatus and method to provide advantages of efficiency and productivity for installing the finned canister or container base of the present invention inserted into the ground or asphalt.

DETAILED DESCRIPTION

Container mounting bases for airport edge lights serve as housings for transformers, electrical junction boxes, and related accessories for runway and taxiway edge lighting fixtures and for airport signs. Edge lights bolt onto the top flange of the containers. These containers, generally designated in FAA specification #AC 150/5345-42 as type L-867 Class I, are designed to withstand light vehicular loads and are subject to direct earth burial with and without concrete encasement. Project design engineers specify whether to use concrete to encase the containers or to bury them directly in the soil. The concrete-encased containers are the most frequently installed, and concrete encasement is considered standard practice.

Description of Conventional (Prior Art) Containers and Installation

Referring now to the Figures and initially to FIG. 1, the conventional containers can be buried directly in the ground as shown and identified generally in FIG. 1 by container apparatus 1 in an earthen hole 6 without any concrete around the container. The conventional containers otherwise can be pre-cast in concrete, as depicted generally as conventional container 3 in FIGS. 2 and 3, and which then are buried in an earthen hole 6. The conventional containers further alternatively can be cast-in-place, e.g., as depicted by containers 4 in FIGS. 4 and 5.

FAA specification #AC 150/5345-42does not require concrete, but it is common practice to utilize concrete-encased containers. It generally is specified by the project design engineer to use concrete-encased containers, whether pre-cast 3 or cast-in-place 4. The concrete is placed around the conventional container mainly for stability to withstand overturning and for securely anchoring the container to the earth. Both the pre-cast 3 and the cast-in-place 4 containers can be installed in paved as well as non-paved areas.

Since one of the purposes for the installation of these containers 1, 3, 4 is to use them as electrical junction boxes, it is common practice at the time they are first installed to cut a trench approximately four inches wide, using a Vermeer or similar equipment, along the entire length of the installation parallel to the runway or taxiway. The trench is cut in the ground or in the asphalt shoulder before installing the containers and is used for laying conduit 9 (FIG. 1a), generally plastic type, which is used for bringing electrical power cables to each junction box in the system.

Figure 6:
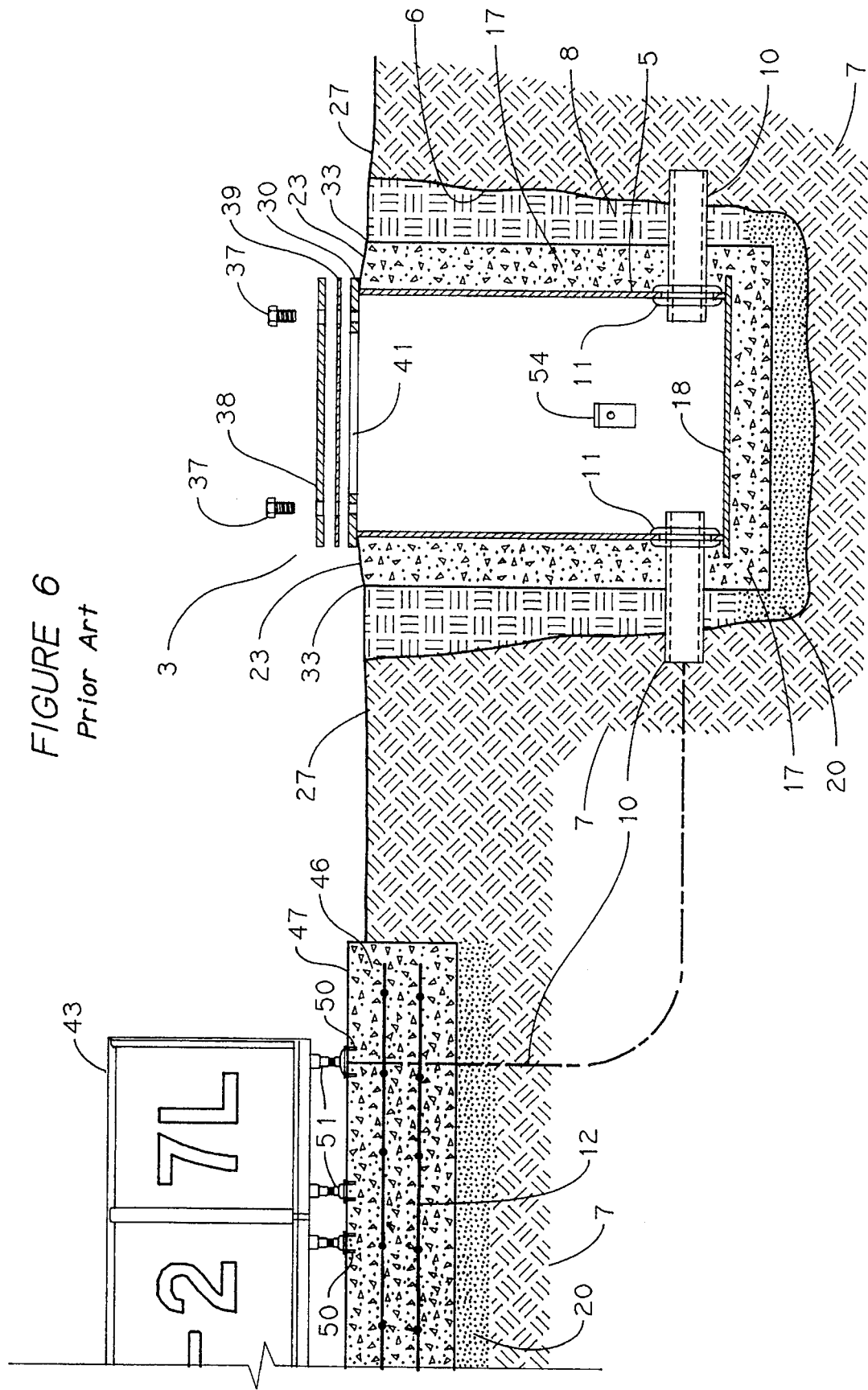
FIG. 6 is an elevation view, partially in section, of a conventional pre-cast-in-concrete container installed in conjunction with an airport sign.

Inside the containers 1, 3, and 4, the electrical contractor installs an isolation transformer and electrical wires and wiring devices required for powering airport edge lights 14 and airport signs 43 (FIG. 6). Such installation is done through an opening 41 at the top of the container. These containers are generally provided with a grounding lug 54.

Conventional (Prior Art) Container Installation

As depicted in FIG. 1, container apparatus sets 1 are buried directly in an earthen hole 6, previously dug, and are used for mounting an edge light 14. Certain general aviation airport project engineers specify this type of installation, but it is not common practice to install the conventional container base directly in the ground without concrete. The containers are a type L-867 Class I or similar FAA specified steel container 5.

Hole 6 is about four feet wide by four feet wide and is dug in the ground 7 or in the asphalt shoulder 28 (FIG. 2). Several inches of sand 20 are placed on the bottom of the hole, so as to set the top flange 30 of the container apparatus 1 slightly above grade 27. Two pieces of conduit 10 are installed on opposite sides, through holes in the container lined with grommets 11. These two pieces of conduit 10 must be aligned with the conduits 9 (FIG. 1a) from the trenches, on two opposing sides of the container apparatus 1, i.e., aligned for bringing power cables to the container.

Conduit 10 is connected to its corresponding conduit 9 from the trenches by means of couplings 13, as can be viewed in FIG. 1a. The container apparatus 1 must be also aligned with respect to other edge lights 14 in the system.

The hole 6 must be backfilled and the filling 8 must be tamped. Then the remaining spoils must be removed, e.g., by loading onto a truck for removal and disposal.

Light fixture 14 is installed upon the top flange 30 of the container apparatus 1. In the case of an installation in an asphalt shoulder 28 (FIG. 3), the asphalt area must be repayed. It is general practice not to bury these containers in an asphalt shoulder without a concrete encasement.

Referring now to FIGS. 2 and 3, the conventional pre-cast-in-concrete container apparatus 3, when used as a base for mounting an edge light 14, consists of a type L-867, Class I or similar FAA specified steel container 5, which has been pre-encased in concrete 17 prior to being brought to the job site, e.g., with about three to six inches of concrete 17 all around it, except for the top. The shape of the encasement could be either rectangular or cylindrical.

A hole 6 of about four feet wide by four feet wide is dug in the dirt (ground) 7, or in the asphalt shoulder 28, as specified by the design engineer. This hole 6 is larger than the overall dimensions of concrete encasement 17. If, in the asphalt shoulder 28, an area of the pavement 28 must be saw-cut, the asphalt 28 must be jack hammered and then removed to allow digging the hole 6 in which the pre-cast in concrete container apparatus 3 is to be set.

Several inches of sand 20 are placed on the bottom of the hole 6. This sand bed 20 is used for leveling and to bring the top flange 30 of the concrete-encased container apparatus 3, ½ to ¾ inches above grade 27 and the outer edge 33 of the concrete up to grade 27.

Generally, the concrete encasement 17 is approximately three to six inches in thickness, thereby forming a three to six inch thick concrete cylinder 17 or block 17 all around the steel container 5, including underneath it, but excluding its top flange 30. The top 23 of this concrete cylinder or block 17 slopes down (½" to ¾") from the top flange 30 of the steel container 5 to the outer edge 33 of the concrete encasement 17 (cylinder or block).

Many edge lights 14 are installed alongside the runways and taxiways. The edge lights are aligned in a straight path, with respect to each other, or are aligned with respect to the taxiway curvature, i.e., at the places where it turns.

These pre-cast-in-concrete container apparatus sets 3 come with a piece of conduit 10, generally plastic, protruding from two opposite sides. These conduits 10, when the pre-cast container apparatus 3 has been installed, coincide with and are connected to corresponding lengths of conduit 9 (FIG. 2a) laid in trenches, on opposite sides of the pre-cast container apparatus 3. The conduits are installed for the purpose of bringing electrical power cables to the containers 3 for the electrical junction box, transformer housing, light fixture 14, or to airport signs 43 (FIG. 6). The connection of conduit 10 to the conduit 9 from the trench is made by means of couplings 13, inside hole 6, as can be viewed in FIG. 2a.

After installing the pre-cast-in-concrete container apparatus 3, the hole 6 is backfilled 8. Backfill 8 is tamped all around the concrete 17, and the remaining spoils must be removed, e.g., by loading them onto a truck for removal and disposal at a remote disposal area.

Finally, the edge lighting fixture 14 is installed by bolting, e.g., by means of six bolts 37 onto the container's top flange 30 by means of its adapter plate 40. Or, in the case of a sign 43 installation, a container cover plate 38 (FIG. 6) and a gasket 39 are bolted onto the container's top flange 30 to prevent water from entering the container apparatus 3. In the case of an installation in an asphalt shoulder 28, the asphalt 28 area must be repaved.

Referring now to FIGS. 4 and 5, conventional cast-in-place container apparatus 4 also consists of a type L-867, Class I or similar FAA specified steel container 5. Their installation also requires digging a hole 6 in the ground 7 or in the asphalt shoulder 28 of approximately four feet wide by four feet wide. If in an asphalt shoulder 28 an area of the pavement 28 must be saw-cut, the asphalt 28 must be jackhammered and then removed to permit digging the hole 6 in which container 5 is to be cast-in-concrete. A jig can be used for centering the steel container 5 inside the hole 6. A jig also can be used for setting top flange 30 at the proper elevation and for setting the proper orientation of the two pieces of conduit 10 to match that of the two pieces on conduit 9, in trenches, required to bring power cables to the cast-in-place container apparatus 4 and also for aligning the container apparatus 4 with respect to the other edge lights 14 in the airport system.

Several inches of sand 20 are placed at the bottom of the hole 6, leaving approximately three inches of space between the sand and bottom 18 of the steel container 5.

Pieces of plastic conduit 10 are installed through holes, with grommets 11, on opposite sides of the cast-in-place container apparatus 4. These conduit 10 pieces protrude beyond the concrete 17 on two opposite sides after the concrete has been poured. They coincide with and are connected to corresponding conduits 9, in trenches on opposite sides of the cast-in-place container apparatus 4, for the purpose of bringing electrical power cables to container apparatus 4. Conduits 10 connect to conduits 9 by means of coupling 13, as can be viewed in FIG. 2a. Concrete 17 is poured all around and under the container bottom 18 and then is vibrated as required.

A slope 23 of ½ to ¾ inch from the top of the container's top flange 30 to the edge 33 of the concrete 17 is hand trowelled at the proper time.

Seven to twenty-eight days must to elapse for proper curing of the concrete before the installation can be completed.

All remaining spoils must be removed as explained before, i.e., loaded onto a truck for removal and disposal at a remote disposal site such as an appropriate landfill.

Finally, an edge lighting fixture 14 is installed by bolting e.g., by means of six bolts 37, onto the cast-in-place container's top flange 30 or, in the case of a sign 43 installation (FIG. 6), a container cover plate 38 and gasket 39 bolted onto the top of the container's top flange 30 to prevent water from entering the cast-in-place container apparatus 4. In the case of an installation in an asphalt shoulder 28, the asphalt 28 area must be repaved.

Figure 7:
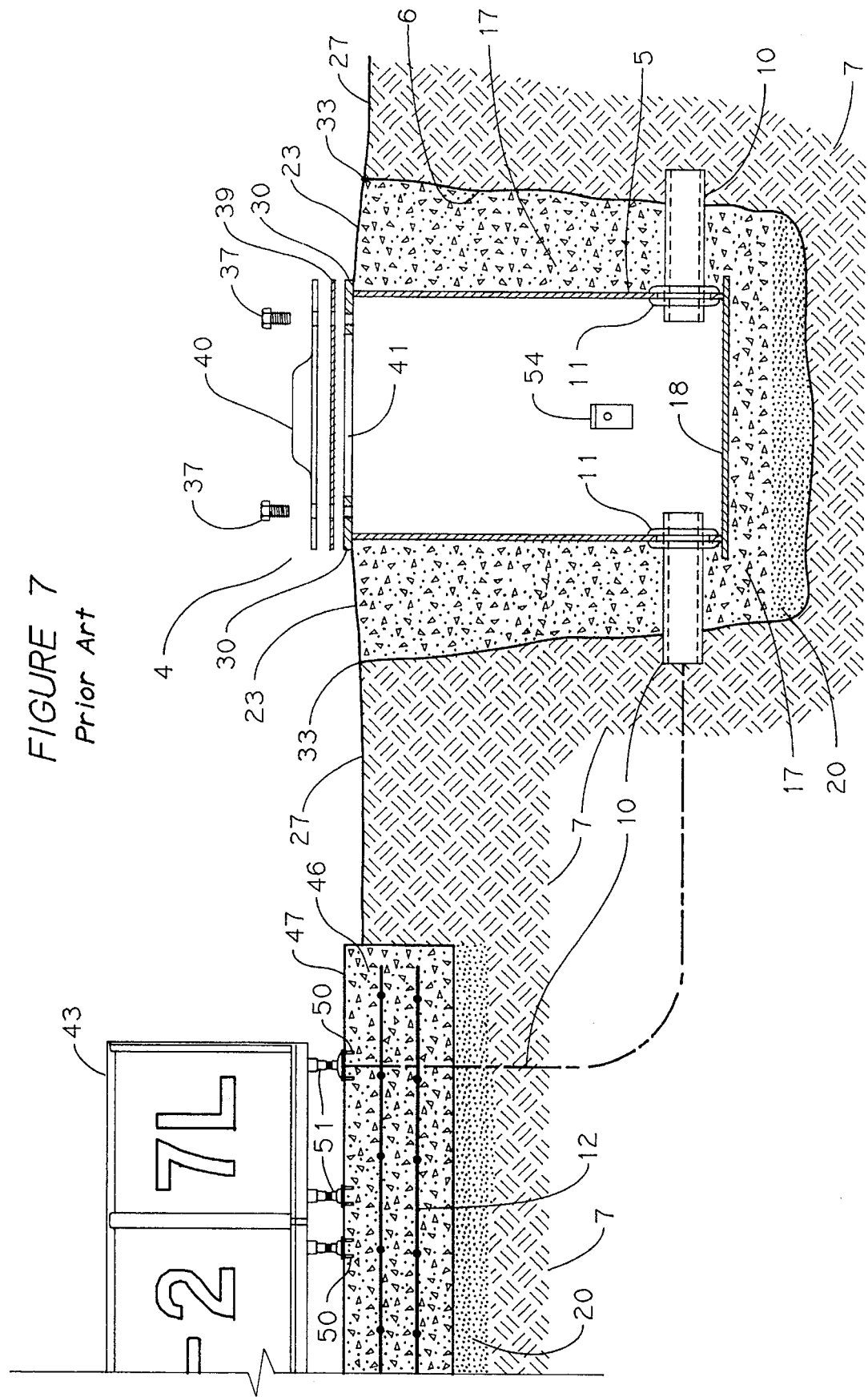
FIG. 7 is an elevation view, partially in section, of a conventional cast-in-place container installed in conjunction with an airport sign.

Referring now to FIGS. 6 and 7, the conventional container now will be described in connection with an airport sign 43 installation. Generally, the airport sign 43 conventional installation consists of mounting the sign 43 on a concrete foundation 46 which can be up to 18 inches in thickness, and it requires setting a type L-867, Class I or any other FAA specified steel container 5 generally encased in concrete, in a hole 6 in the ground 7 near the sign foundation 46 to serve as a transformer housing and a junction box to bring power to the sign 43. These concrete foundations 46 for airport signs 43 are approximately eighteen inches longer and wider than the sign.

Again, as for the edge light base application, the FAA specification allows the encasement in concrete 17 of the L-867, Class I steel container 5, but does not mandate it.

Nevertheless, it is common practice for the project design engineers to specify the encasement in concrete 17 for the L-867, Class I junction box 5 associated with an airport sign 43 installation, i.e., pre-cast conventional container apparatus 3 or cast-in-place conventional container apparatus 4.

Therefore, the installation of an airport sign 43 consists, among others, of two concrete components, i.e., the sign foundation 46 (concrete foundation) and the concrete encased container apparatus 3, 4.

Both components could be pre-cast concrete or cast-in-place concrete. Occasionally, these two components are pre-cast in one single piece. However, pre-cast in one single piece is not preferred conventionally because it is very difficult to make level because of the irregular, unbalanced shape.

The installation of the conventional pre-cast concrete encased container apparatus 3 in connection with an airport sign 43, FIG. 6, follows the same procedure, previously explained for installation in conjunction with taxiway, runway edge lights 14.

A hole 6 is dug in the ground 7 to accommodate both the precast concrete sign foundation 46 and the pre-cast container apparatus 3. These pre-cast concrete foundations 46 have rebar 12 reinforcement in the concrete 46.

Bedding material 20 is set on the bottom of the hole 6. The pre-cast concrete sign foundation 46 is set on the bedding material 20, which has previously been leveled. The top 47 of the concrete sign foundation 46 is generally set at about 1–1 ½ inches above grade 27.

These pre-cast concrete sign foundations 46 are provided with inside threaded anchors 50 set in the concrete 46, at the top 47, either during the casting process or when they are field installed. These anchors 50 are used for bolting on the airport sign 43. They are also used to attach eye bolts for lifting the foundation.

A piece of conduit 10 is provided and protrudes (not shown) through the top 47 and also, generally, through the bottom of the concrete foundation 46. This conduit 10, generally a plastic type, is used for pulling power cables from the junction box container apparatus 3, i.e., the pre-cast concrete container apparatus 3, for bringing electrical power to the airport sign 43 through one of its legs 51. The conduit 10 is extended, as required, to attach to the pre-cast concrete container apparatus 3 after the pre-cast concrete container apparatus 3 is set in the hole. Pre-cast container apparatus 3 is also on bedding material 20 and leveled to a height whereby its top flange 30 is positioned above grade 27, and its concrete sloped top side 23 and edge 33 is set at grade 27.

The conduit 10, as explained before, is attached to the precast concrete container apparatus 3 at the corresponding piece of conduit 10 which protrudes through the container's concrete encasement 17 by means of a coupling.

The container apparatus sets 3 have a second piece of conduit 10, on the opposite side, required for bringing power to the junction box apparatus set 3 transformer. This second piece of conduit 10 attaches to conduit 9 in a trench, by means of coupling 13, as can be viewed in FIG. 2a.

The pre-cast concrete sign foundation 46 and the pre-cast concrete container apparatus 3 can be purchased as a one-piece element, but it is not common practice because it is very difficult cult to handle.

The installation of the conventional cast-in-place concrete encased container apparatus 4, in connection with an airport sign 43, as can be viewed in FIG. 7, also follows the same procedure, previously explained for their installation in conjunction with taxiway, runway edge lights 14.

Digging a hole 6 in the ground 7 is required to accommodate both the sign foundation 46 and the cast-in-place container apparatus 4. Then, bedding material 20 is placed on the bottom of the hole 6.

A pouring form of the proper size is built for pouring concrete 46 to provide a cast-in-place concrete foundation 46 for the sign 43. Rebar reinforcement 12 is set in the pouring form. The final top 47 of this foundation 46 is cast to about 1 to 1½ inches above grade 27. A piece of conduit 10 is placed at the proper location where the sign foundation 46 will be cast and will be protruding above its intended top 47. This conduit 10 is held in position by tieing it against the rebar 12 to coincide with the proper leg 51. This conduit 10 is extended to be introduced through one of two side holes (on opposite sides) of the steel container 5, which is set close by to be cast in concrete. These side holes are provided with grommets 11. The steel container 5 has been set on a jig so as to allow its top flange 30 to be above grade 27 and for the concrete 17 to get under its bottom 18. A second piece of conduit 10 is attached to the hole on the opposite side of the container 5 to extend beyond the intended edge of the concrete encasement 17. This second piece of conduit 10 is required for bringing power to the cast-in-concrete 4 junction box and is attached to conduit 9, by means of coupling 13, all previously laid in a trench, as can be viewed in FIG. 2a.

Concrete is then poured and vibrated on the entire area, i.e., the sign foundation 46 form and around the metal container 5 and under bottom 18. At the proper time, a slope 23 is hand trowelled on the concrete 17 surrounding the container apparatus 4, sloping down from the top of the container's top flange 30 to the edge 33 of the concrete 17, which is at grade 27, i.e., at approximately a ½ to ¾ inch slope 23.

After a curing time of seven to twenty eight days, the form is removed, the area is backfilled, and the soil 7 tamped. As previously explained, all debris is removed by loading onto a disposal truck.

Performing construction activities on an airfield conflicts with normal aircraft/airfield operations. As a result, portions of the airfield are often closed for a period of time to allow construction activities to proceed.

Those closures are extremely disruptive to aircraft/airfield operations and result in delays particularly at peak traffic periods. Furthermore, airfield closures are costly. Studies at Pittsburgh International Airport determine the overall cost of a taxiway or runway closure to be $30,000 to $60,000 per day. The variance in cost is dependent upon the location of the closure. A primary component of the high cost of construction closures is the amount of additional fuel and taxi time required to detour around closed areas. Thus these costs would be dependent upon the volume of aircraft traffic using the airfield.

Index of Itemized List of Elements in Conventional (Prior Art) Containers

In respect to the Figures in the drawings of the specification of the present invention, like items are identified by like numerals, and a list of the items describing the conventional containers is presented as follows.

1 Conventional Container without concrete, buried in an earthen hole or in an asphalt paved shoulder.
3 Conventional Pre-Cast Container.
4 Conventional Cast-in-place Container.
5 L-867, Class I Container
6 Hole in the ground
7 Soil, Ground
8 Backfilling
9 Conduit from trench 10 Conduit
11 Grommets
12 Rebar
13 Coupling
14 Edge Light
17 Concrete Encasement—Pre-Cast or Cast-In-Place
18 Bottom of the Conventional Container
20 Sand—Bedding Material—Sand Bed
23 Slope at top of concrete encasement
27 Grade
28 Asphalt Shoulder
30 Container Top Flange
33 Outer Edge of Concrete Encasement
37 Bolts
38 Container Cover Plate
39 Gasket
41 Top Opening
43 Airport Sign
46 Concrete Foundation: Pre-Cast or Cast-In-Place
47 Top of Concrete Sign Foundation
50 Inside Threaded Anchors
51 Sign Support Legs
54 Grounding Lug

DETAILED DESCRIPTION OF THE PRESENT INVENTION

The finned canister (finned container base) of the present invention includes a cylindrical steel body of the required height and diameter to which vertical fins are welded. The fins are welded to the outside surface of the cylindrical body, parallel to the finned light base axis and spaced apart. The finned canister (finned container base) is provided with flanges, one continuously welded to its bottom sidewalls and another continuously welded to its top sidewalls. The top flange is drilled and tapped to receive the required bolts for the installation of the edge light. Openings are provided near the bottom of the cylindrical body and are used for installing grommet type seals through which a conduit of the proper size can be installed. The purpose of the conduit is to bring electrical wiring into and out of the finned canister (finned container base). The finned canister (finned container base) also is provided, when required, with a grounding lug welded to its cylindrical body. The finned light base can be hot dip galvanized for corrosion protection.

The finned containers of the present invention provide apparatus and method to reduce substantially the down time duration required for construction. This significant reduction in down time saves substantial costs for the air carriers affected by these construction closures. The new finned container apparatus and method of the present invention also reduce required trips across the airfield to deliver and remove materials and equipment. This results in a safer airfield environment by eliminating potential vehicle congestion as well as Foreign Object Damage (F.O.D.) potential. In addition, these new apparatus and methods of installation of the present invention are cost effective in lieu of the conventional methods of installation.

Referring now to FIGS. 8, 9, and 10, the apparatus and method of the present invention relate to a new Finned Container. Finned container apparatus 101 is used as mounting bases for taxiway and runway edge lights 114. Finned container apparatus 101 also serves as transformer housings and electrical junction boxes for such runway edge lights as well as for airport signs.

The finned container apparatus sets 101 are installed in non-paved areas as well as in asphalt shoulders. The finned container apparatus set 101 can be pushed into a pre-augered hole by hydraulic pressure from an augering machine or can be installed directly in the soil. The finned container apparatus set 101 can be pushed by a Push-It Machine whether directly in the soil or in the asphalt shoulder of an airport runway or taxiway.

The Push-It Machine is a patent pending apparatus and method used for the installation of finned pipe foundations, e.g., which are used for mounting airport signs. The Push-It Machine is described in more detail hereinbelow.

The finned container apparatus 101 does not require concrete encasement and provides substantially increased resistance to overturning and to torsion, by anchoring it to the earth, thereby providing substantially increased stability. The finned container apparatus 101 also provides increased load bearing capacity sufficient for the occasional light vehicular traffic to which light bases may be subjected on runway and taxiway shoulders.

The finned container apparatus 101 as viewed in FIGS. 8, 9 and 10 includes cylindrical steel body 103, generally an L-867, Class I or similar F.A.A. specified steel container 103 of the required height and diameter together with a plurality of vertical fins, e.g., such as in one embodiment, four vertical steel fins 104 welded at 105. The fins 104 are welded at 105 to the outside surface of the cylindrical body 103 of the steel container 103, parallel to the finned container apparatus 101 axis and spaced equidistantly apart, e.g., such as in one embodiment, four fins spaced at about ninety degrees apart. The finned container apparatus 101 is provided with a bottom steel plate 118, continuously welded to its cylindrical wall 103. The finned container apparatus 101 is also provided with a steel flange 130 continuously welded to its top. This top flange 130 is drilled and tapped to receive the required bolts 137 (FIG. 13) for the installation of an edge light 114 or a gasketed steel cover plate 138. The top flange 130 provides an opening 141 for providing access to the inside of the finned container apparatus 101, e.g., for installing a transformer and electrical wiring.

The top edge 144 of the fins 104 is positioned not parallel to the top flange 130. The top edge 144 angles down from the welded point 145 underneath the top flange 130 and toward the side of the fins 104. The downwardly angled top edge facilitates removal from the ground so that the canister can be reused and installed in another location.

It has been found that the top edge on the vertical finned installation and support means should be positioned at a downwardly extending angle to the top flange, e.g., preferably of about 10°–45°, from the horizontal down from the welded point underneath the top flange and toward the side of the finned vanes extending radially outward from the container base, thereby to provide the economical advantage wherein the canister is reusable by removal and reinstallation at another location.

The bottom edge 148 of the fins 104 is positioned not parallel to the bottom flange 118, but rather is adapted to be disposed at an angle which facilitates penetration and provides a capability to cut through asphalt and compacted sub-base material if installed in a pre-augered hole in an asphalt shoulder, or through soil if installed in the ground, when pushed downwardly by the Push-It Machine.

It has been found that the bottom edge on the finned vanes should extend radially outward from the container base at a penetrating angle of at least about 40° from the horizontal to the bottom flange for penetrating earthen or asphalt material when pushed downwardly.

Two or more openings 111 are provided near the bottom of the cylindrical body 103 and spaced apart, e.g., diametrically opposed to each other. Two or more openings 111 are used for installing grommet 112 type seals through which a conduit, e.g., generally a plastic type, of the proper size can be installed. The purpose of the conduit is to bring electrical wiring into and out of the finned container apparatus 101 for providing electrical power to a lighting fixture or to an airport sign.

The finned container apparatus 101 also is provided, when required, with grounding lugs 154 welded to its cylindrical body 103.

The finned container apparatus 101 is hot dip galvanized for corrosion protection, and it is reusable, i.e., can be easily removed and reinstalled at another location.

Figures 11, 11A:
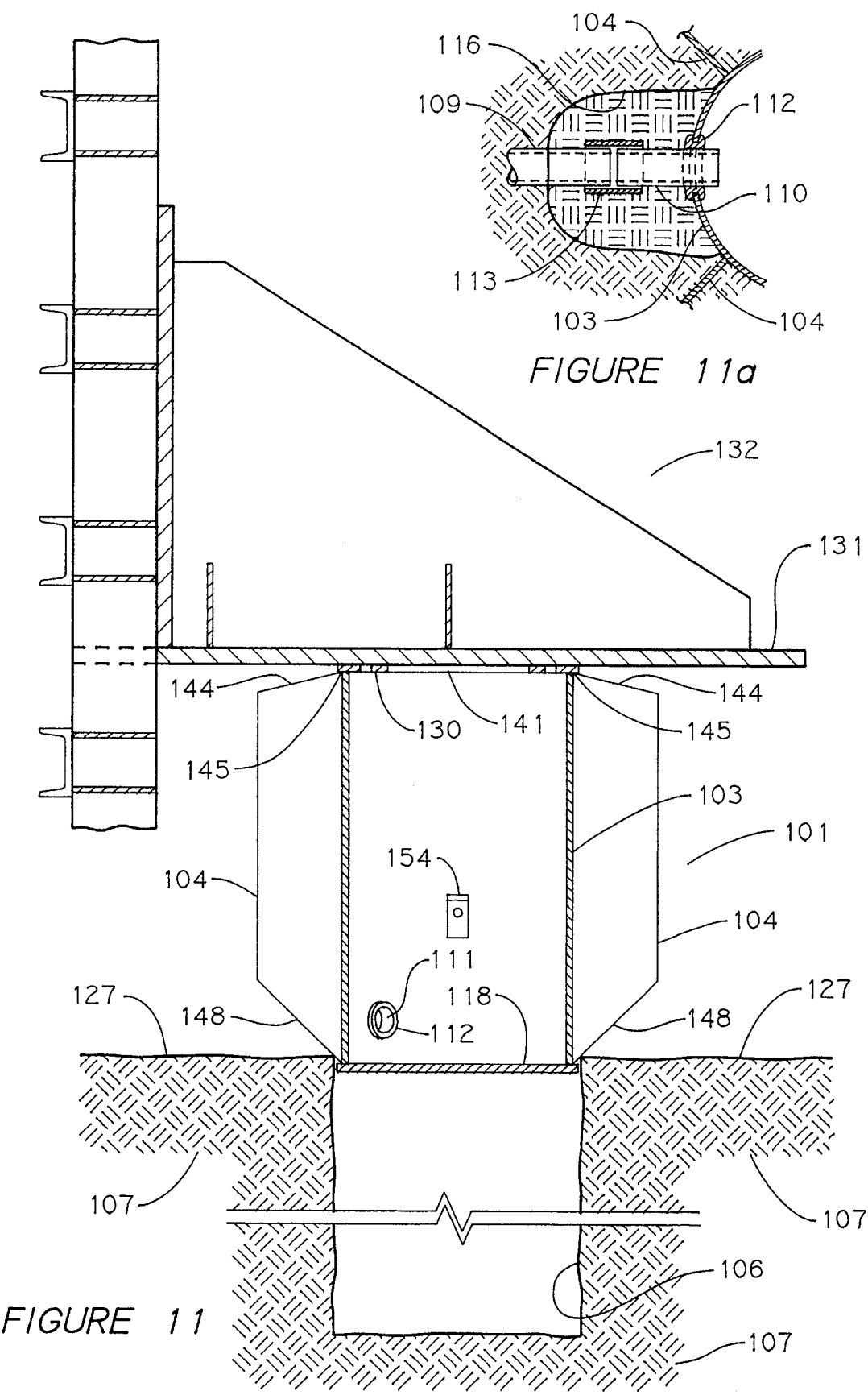
FIG. 11 is an elevation view, partially in section, showing the finned container of the present invention being installed in the ground by a Push-It Machine, in accordance with the present invention.
FIG. 11a is a plan view, partially in section, showing a piece of conduit coming out of the finned container of the present invention and its connection to a conduit previously laid underground.

Referring now to FIG. 11, finned container apparatus 101 is installed directly in the ground, i.e., a non-paved surface by Push-It Machine apparatus 132. This type of installation by Push-It Machine apparatus 132 applies to both the installation of the finned container apparatus 101 in conjunction with an edge light 114 (FIG. 13), as well as in conjunction with an airport sign 143 (FIG. 14). Using an auger, provided by a Push-It Machine or any other augering apparatus, hole 106 is augered at the required location. This hole 106 should be of approximately the same diameter as that of the finned container apparatus 101 bottom flange 118, i.e., not including the fins 104.

Generally, a trench 116 has been dug across the entire length of the installation, and conduit 109 (FIG. 11a) is laid prior to installing the containers for the purpose of bringing power cables to the installation. This trench 116 runs parallel to the airport runway or taxiway. A hole of approximately two feet in length, by six inches in width, can be dug on both sides of finned container apparatus 101 (if the trench had been backfilled) to reach conduit 109 and to connect conduit 110 by means of coupling 113. Hole 116 must be backfilled and tamped, and the area repaved.

Grommets 112 are installed in each of the two opposing holes 111 on the finned container apparatus 101 wall 103. Pieces of conduit 110, preferably plastic type, are introduced through each one of the two grommets 112. These grommets 112 provide a water tight seal between the conduit 110 and the finned container apparatus 101 wall 103. The length of the conduit pieces are to be sufficient to allow connecting to conduit 109 by means of coupling 113, as viewed in FIG. 11a.

The finned container apparatus 101, FIG. 11, is positioned on top of the augered hole 106 so as to have the bottom edge 148 of the fins resting on the grade 127. The bottom 118 of the container apparatus 101 faces the augered hole 106. The two pieces of conduit 110, on diametrically opposed sides of the finned container apparatus 101, are set approximately above and parallel to the trench center line.

Since the trench runs parallel to the airport runway or taxiway, by following the above-described method, the finned containers apparatus 101 are actually in alignment with respect to all others in the system.

The pushing plate 131 of the Push-it Machine pushing and augering carriage 132 now is positioned flat on top of the top flange 130 of the finned container apparatus 101, by slowly lowering the Push-it Machine pushing and augering carriage 132 by means of its hydraulic system.

The level of finned container apparatus 101 is verified, prior to proceeding to push the finned container apparatus 101 into the hole 106 with its fins 104 cutting through ground 107, by means of pushing carriage 132, until top flange 130 is at one half to three quarters of one inch above the grade 127. The Push-it Machine then is removed.

Each of the two pieces of conduit 110 from the finned container apparatus 101 are attached to the conduit 109 laid in the trench (FIG. 11a) on both sides of the container apparatus 101 by means of conduit and couplings 113. Now the finned container apparatus 101 is ready for a transformer and wiring to be installed inside it, after which a lighting fixture can be installed by bolting to the container's top flange 130 (FIG. 13), or a top cover plate 138 with a gasket 139 (FIG. 14) can be bolted onto it, when used as a junction box in conjunction with an airport sign 143.

The airport sign 143 has been set on a concrete foundation 146 which can be pre-cast or cast-in-place. The top 147 of the sign foundation 146 has been set at 1 to ½ inches above grade 127 and provides inside threaded anchors 150 for bolting the sign support legs 151 to the top 147 of the concrete foundation 146. Sign foundation 146 also provides a piece of conduit 110 which is extended and connected to a conduit from the finned container apparatus 101 for the purpose of powering the airport sign 143.

In both cases, edge light 114 or airport sign 143, the spoils of the augering must be removed by loading onto a truck. Nevertheless, the quantity is substantially less than conventional methods, which require digging a large hole with a backhoe, placing sand on the bottom, for leveling as well as for establishing elevation and then backfilling the hole and tamping down the fill.

Figure 12:
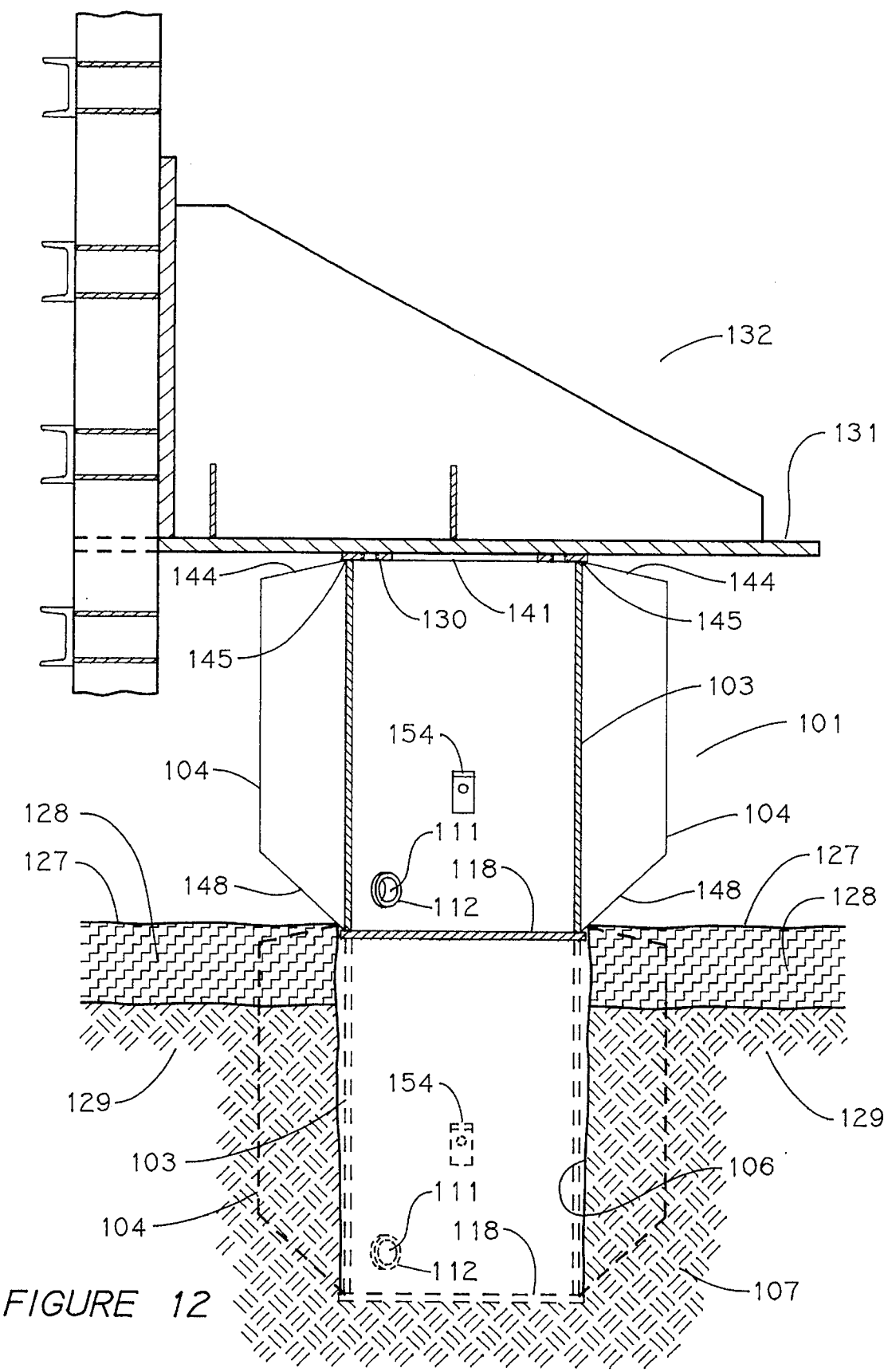
FIG. 12 is an elevation view, partially in section, showing the finned container of the present invention being installed by a Push-it machine in an asphalt shoulder, in accordance with the present invention.

Referring now to FIG. 12, the finned container apparatus 101 is installed in the asphalt shoulder 128 of a runway or taxiway, i.e., paved area. This type of installation is different in that hole 106 must be augered through the asphalt 128 and through the layer of compacted sub-base material 129. The fins 104 in the container apparatus 101 are positioned on the asphalt shoulder 128 with bottom 118 facing the hole 106. The two pieces of conduit 110, on diametrically opposed sides of finned container apparatus 101, are set approximately above and parallel to the trench center line, to coincide with the position of conduits 109 (FIG. 11a).

The pushing plate 131 of the Push-it Machine's pushing and augering carriage 132 now is positioned flat on top of the top flange 130 of the finned container apparatus 101, by slowly lowering the Push-It Machine pushing and augering carriage 132 by means of its hydraulic system.

The level of finned container apparatus 101 is verified prior to proceeding to push the finned container apparatus 101 into the hole 106 with its fins 104 cutting through asphalt 128 and compacted sub-base 129 by means of pushing carriage 132, until top flange 130 is at one half to three quarters of one inch above grade 127. The Push-It Machine is then removed.

Hole 116 (FIG. 11a), approximately two feet in length by six inches in width, can be dug on both sides of finned container apparatus 101 (if the trench had been backfilled), to make the connections between conduits 110 and conduits 109 by means of couplings 113 inside holes 116. After completion, these holes must be backfilled, tamped, and the asphalt replaced. The transformer installation and the electrical wiring can be completed, and the edge light 114 can be mounted on the top flange 130 of the finned container apparatus 101 by means of the edge light adapter plate 140 (FIG. 13), or a top cover plate 138 with a gasket 139 can be bolted onto it as in the case of an installation in conjunction with an airport sign 143 (FIG. 14).

After the installation is complete, the earthen spoils are removed by loading onto a truck. The spoils are substantially less than those produced by conventional methods which require saw-cutting a large area of asphalt of at least four feet by four feet, which then must be jackhammered out, for the purpose of digging a large hole with a backhoe, and which then must be backfilled, compacted, and repaved.

Index of Itemized List of Elements of the Present invention

In respect to the Figures in the drawings of the specification of the present invention, like items are identified by like numerals, and a list of the items describing the present invention is presented as follows.

101 Finned Container Apparatus
103 Cylindrical, Steel Body or a Type L-867—Class I Container
104 Steel Fins
105 Weldment—Fins to Container
106 Pre-Augered Hole
107 Soil, Ground
109 Conduit from trench
110 Conduit
111 Opening
112 Grommets
113 Coupling
114 Edge Light
115 Rebar
116 Hole dug for connecting conduits
118 Bottom Steel Plate
127 Grade
128 Asphalt Shoulder
129 Compacted sub-base material
130 Finned Container Top Flange
131 Lower Pushing Plate of "Push-it" Machine
132 Pushing and Augering carriage of "Push-it" Machine
137 Bolts
138 Finned Container Cover Plate
139 Gasket
140 Edge Light Adapter Plate
141 Top Opening—Finned Container
143 Sign
144 Top Edge Of Fins
145 Welded Point Under The Top Flange
146 Sign Concrete Foundation
147 Top Of Concrete Sign Foundation
148 Bottom Edge Of Fins
150 Inside Threaded Anchors
151 Sign Support Legs
154 Grounding Lug The present invention provides a finned light base or finned container used as mounting bases, for taxiway and runway edge lights, as well as transformer housings and electrical junction boxes for such lights as shown in the accompanying drawings provided showing the finned light base (finned container). The present invention provides a finned container base or finned canister also used as electrical junction boxes for airport signs.

The finned canister base of the present invention is structurally and geotechnically engineered with dimensions to provide the equivalent of a concrete encasement for each specific application. The design of finned canisters or container bases of the present invention is based on engineering calculations backed by independent, registered professional engineers and by extensive testing. For the calculations of the structural capacities, each finned canister can be designed to take into consideration the geotechnical characteristics of the soil into which it will be installed, i.e., soil density, shear strength, plasticity, moisture content, and grain size. Each finned canister or container base of the present invention can be designed to exceed the load requirements of the vehicular traffic to be placed upon it.

The canister or container base of the present invention is installed by a simple, yet revolutionary method. The canisters or container bases of the present invention are pressed into the soil. Generally, the finned canister or finned container base is installed by a "Push-It" Machine. The many drawbacks associated with conventional concrete installation methods are eliminated or substantially reduced by installing the finned metal canister or container base of the present invention by the Push-It Machine.

The mobile Push-It Machine push-it and installation apparatus and method provide important advantages of efficiency and productivity for installing the finned canister or container base of the present invention inserted into the ground. On the same day, utilizing the Push-It Machine and installation method, a runway edge light or airport sign can be set into the soil.

The canister base provides a top plate pre-drilled to accept mounting bolts upon which the structure can be installed. The finned canisters are installed, and moments later the structure can be installed, wired, and energized.

The finned canister or finned container base and installation method of the present invention allow the entire installation to be performed in only one day, with one trip to the structure installation site. In the amount of time required to install one concrete-encased canister by the prior art, conventional method, eleven or more canister bases of the present inventions can be installed. In addition, all eleven would have been installed at a lower cost and with a greater level of safety. Airfield closure time can be dramatically reduced.

Moreover, the finned canister or finned container base of the present invention can be reused. If it becomes necessary to relocate the canister base, the finned canister or finned container base of the present invention can be removed and reinstalled at the new location. This removal and reinstallation provides not only a significant cost savings, but it removes any hazard associated with abandoned concrete piers or pads.

In the case of airport signs and depending on the overall length of the sign, two foundations may be required, and a second steel "sign plate" may be required also. The length and width of the second steel plate depends upon the length and width of the airport sign as measured at its base. In the case of more than one foundation, the "sign plate" is bolted to the top plate of each foundation. All structural dimensions are calculated on the basis of the loads to be supported by the foundation.

The airport sign plate can be drilled and tapped to accept a PVC conduit adapter which is male threaded on one end where it attaches from the bottom to the sign plate and female, PVC to PVC, at the other end. This enables the attachment of a length of PVC conduit to connect the sign to the canister base junction box.

The Push-It Machine associated with the present invention includes a novel mobile, truck-mounted finned canister push-it and installation machine for installing prefabricated, longitudinally-finned, cylindrical canister bases of the present invention into the ground by pushing the novel canister base through pushing forces provided by hydraulic cylinders mounted on the mobile, truck-mounted cannister base push-it and installation machine.

Referring to FIG. 12, the Push-It Machine associated with the present invention includes a truck-mounted crane and a tower for holding a push-it carriage 132 including cannister base holder 131. The novel machine and method of the present invention installs the cannister base of the present invention in one step as the push-it carriage 132 is pushed toward the ground.

In one embodiment of the Push-It Machine, hydraulic pushing cylinders push against a header frame held in adjustable side bar securing positions on a tower, i.e., the hydraulic cylinders push against a bar secured to each side frame of the tower. After the hydraulic cylinders extend to a maximum extension, the bar can be advanced to a lower position in the side frame of the tower, and the hydraulic cylinder assembly is lowered so that it can push against the bar in its lower position.

The finned container base or finned canister does not require concrete support and provides a substantially increased resistance to overturning and to torsion. The finned container base or finned canister also provides an increased load bearing capacity, more than sufficient for the occasional light vehicular traffic to which container bases may be subjected at the edge of runways and taxiways.

The present invention provides a finned base container set, used for all the purposes conventional embedded containers are used, i.e., to serve as bases for lighting fixtures, as transformer housings, and as junction boxes, including but not limited to airport edge lights and signs, but with major and significant differences from conventional embedded containers. The container sets of the present invention are capable of efficient and economical installation. Also, the containers of the present invention provide for precise and simplified, economical installation of the edge lighting fixtures and airport signs.

The finned base container set of the present invention is used to completely replace the old art, while being installed efficiently and economically.

The following items list the important advantages of the finned containers of the present invention over the conventional containers used for airport runways/taxiways edge light supports, junction boxes, and the like, as well as for airport sign junction boxes.

a) The new finned container apparatus and method of the present invention do not require using a backhoe for digging a hole for setting the container in the ground. A "Push-It" Machine is used instead, whether the installation is directly in the ground or in asphalt shoulder.

b) For installations on the asphalt shoulder, the new finned container apparatus and method of the present invention eliminate saw-cutting an area of asphalt and then jackhammering it to remove the pieces, thus reducing the amount of repaving required.

c) The new finned container apparatus and method of the present invention eliminate the pre-cast concrete encasement as well as casting in place, which in turn eliminates hand trowelling the slope at the top, while still providing equal or better stability, overturning resistance, anchoring to the earth, and torsional resistance all at a lesser cost.

d) By eliminating the need for concrete, the new finned container apparatus and method of the present invention eliminate the need for concrete mixing trucks traveling across the aircraft traffic areas. The new finned container apparatus and method of the present invention further eliminate the need for a centering jig as is the case for the conventional cast-in-place containers.

e) By eliminating concrete, the seven to twenty-eight day curing period is eliminated, substantially reducing closure time.

f) Closure time and costs are also substantially reduced because the edge light or sign installation can be completed the same day the finned containers are installed, thus requiring one single trip for their installation.

g) The new finned container apparatus and method of the present invention eliminate the need for setting bedding material underneath the container for bringing it to the desired height.

h) The new finned container apparatus and method of the present invention significantly reduce the amount of debris to be removed from the work area.

i) All of the above substantially reduce the amount of trips across the airfield. The new finned container apparatus and method of the present invention, in terms of significant economical importance, provide the advantage and benefit of increased aircraft landing and take-off safety in two major aspects: 1. Because of substantially reduced vehicular congestion and 2. Because of substantially reduced Foreign Object Damage (F.O.D.) potential.

j) The significant reduction of aircraft traffic area closure time, together with elimination of concrete encasement, substantial reduction in backhoe digging, elimination of asphalt saw-cutting, elimination of jackhammering, and the significant reduction of debris handled as well as hauled away across the airfield, efficiently and substantially reduce the overall cost to the airport and airline owners.

k) The finned container is reusable.

Thus it can be seen that the invention accomplishes all of its objectives.

Although the invention has been illustrated by the preceding actual examples, it is not to be construed as being limited to the materials or procedures employed therein.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modifications, and variations will be apparent to those skilled in the art in light of the foregoing detailed descriptions.

Whereas particular embodiments of the invention have been described in detail hereinabove, for purposes of illustration, it will be evident to those skilled in the art that numerous variations of the details may be made without departing from the invention as defined in the appended claims.

Accordingly, this invention is intended to embrace all such alternatives, modifications, and variations which fall within the spirit and scope of the appended claims.

What is claimed is:

1. An airport junction box container set apparatus, comprising:

(a) a junction box having a container base for placement as a partially embedded junction box in an airport runway, taxiway, or other aircraft ground traffic area;

(b) vertical finned installation and support means connected to said container base, positioned parallel to the longitudinal axis of said container base, and having a plurality of finned vanes spaced apart around the circumference of said container base and extending radially outward from said container base for providing lateral stability and strength to said junction box to permit push-it installation and to support loads imposed on said container base when positioned in an airport runway, taxiway, or other aircraft ground traffic areas;

(c) a top flange on said junction box;

(d) a top edge on said vertical finned installation and support means positioned at a downwardly extending angle to said top flange, wherein said top edge angles down from a welded point underneath said top flange and toward the side of said finned vanes extending radially outward from said container base;

(e) a bottom on said container base; and (f) a bottom edge on said finned vanes extending radially outward from said container base positioned at a penetrating angle to said container base bottom for penetrating earthen or asphalt material when pushed downwardly.

2. An airport junction box container set apparatus as set forth in claim 1, wherein said finned vanes extend radially outward from said container base a distance of at least about one half the radius of said container base for providing lateral stability and strength to support loads imposed on an airport runway, taxiway, or other aircraft ground traffic areas.

3. An airport junction box container set apparatus as set forth in claim 2, said junction box having (g) top light attachment means on said top flange of said junction box for securing an airport edge light to at least one of a plurality of bolt holes spaced substantially equally apart.

4. An airport junction box container set apparatus as set forth in claim 2, said junction box having (g) top cover and gasket means secured on said top flange of said junction box for providing a substantially sealed junction box for an airport sign.

5. An airport junction box container set apparatus as set forth in claim 2, wherein said junction box is reusable by removal and reinstallation at another location.

6. An airport junction box container set apparatus as set forth in claim 2, wherein said top edge on said vertical finned installation and support means is positioned at a downwardly extending angle to said top flange of about 10°–45° from the horizontal down from said welded point underneath said top flange and toward said side of said finned vanes extending radially outward from said container base; and said bottom edge on said finned vanes extends radially outward from said container base at a penetrating angle of at least about 40° from the horizontal to said container base bottom for penetrating earthen or asphalt material when pushed downwardly.

7. An airport junction box container set apparatus as set forth in claim 6, wherein said junction box is composed of steel and said vertical finned installation and support means are welded to the side of said container base.

8. An airport junction box container set apparatus as set forth in claim 7, wherein said container base contains at least two apertures near the bottom of said container base and spaced apart and a grommet seal in each aperture for installing a conduit to bring electrical wiring into and out of said junction box container set apparatus for providing electrical power to a lighting fixture or to an airport sign.

9. An airport junction box container set apparatus as set forth in claim 8, wherein said container base contains a grounding lug welded to said container base.

10. An airport junction box container set apparatus as set forth in claim 9, comprising at least four vertical finned vanes extending longitudinally the full length of said junction box, wherein said four vertical finned vanes are positioned spaced apart at about ninety degree intervals around the circumference of said junction box.

11. An airport junction box container set apparatus as set forth in claim 10, wherein said container base is hot dip galvanized for corrosion protection.

12. A method of installing an airport junction box container set apparatus, comprising:
(a) providing an airport junction box container set apparatus having a container base and a bottom surface on said container base;
(b) providing vertical finned installation and support means connected to said container base, positioned parallel to the longitudinal axis of said container base, and having a plurality of finned vanes welded to the side of said container base spaced apart around the circumference of said container base and extending radially outward from said container base a distance of at least about one half the radius of said container base for providing lateral stability and strength to said junction box to permit push-it installation and to support loads imposed on said junction box in an airport runway, taxiway, or other aircraft ground traffic areas; and
(c) pushing said container base and finned vanes into the ground.

13. A method of installing an airport junction box container set apparatus as set forth in claim 12, further comprising:
(d) drilling a hole in the ground in advance of said pushing said junction box container set apparatus into the ground, wherein said hole is substantially the size of said bottom surface on said container base.

14. A method of installing an airport junction box container set apparatus as see forth in claim 13, further comprising:
(e) providing a bottom edge on said finned vanes extending radially outward from said container base positioned at a penetrating angle of at least about 40° from the horizontal to said bottom flange for penetrating earthen or asphalt material when pushed downwardly.

15. A method of installing an airport junction box container set apparatus as set forth in claim 14, further comprising:
(f) providing a top edge on said vertical finned installation and support means positioned at a downwardly extending angle to a top flange, wherein said top edge extends at an angle of about 10°–45° from the horizontal down from a welded point underneath said top flange and toward the side of said finned vanes extending radially outward from said container base.

16. A method of installing an airport junction box container set apparatus as set forth in claim 15, further comprising:
(g) removing said container base and reusing and reinstalling said junction box at another location.

17. A method of installing an airport junction box container set apparatus as set forth in claim 16, comprising pushing said junction box container set apparatus into the ground using a push-it machine.

18. A method of installing an airport junction box container set apparatus as see forth in claim 16, comprising
(h) providing a mobile platform;
(i) holding said junction box container set apparatus on said mobile platform; and
(j) pushing said junction box container set apparatus by said mobile platform into the ground.

19. A method of installing an airport junction box container set apparatus as set forth in claim 18, further comprising:
(k) providing a push-it carriage controllably movably supported on said mobile platform and hydraulic cylinders pushing against said push-it carriage on said mobile platform for pushing said junction box container set apparatus into the ground.

20. An airport junction box container set apparatus, comprising:
(a) a junction box having a cylindrical galvanized steel container base for placement as a partially embedded junction box and having an aperture near the bottom of said container base for installing a conduit to bring electrical wiring into and out of said junction box for providing electrical power to a lighting fixture or to an airport sign in an airport runway, taxiway, or other aircraft ground traffic area;

(b) vertical finned installation and support means connected to said container base, positioned parallel to the longitudinal axis of said container base, and having a plurality of finned vanes welded to the side of said container base spaced apart around the circumference of said container base and extending radially outward from said container base a distance of at least about one half the radius of said container base for providing lateral stability and strength to said junction box to permit push-it installation and removal and no support loads imposed on said junction box in an airport runway, taxiway, or other aircraft ground traffic areas;

(c) a top flange on said junction box;

(d) a top edge on said vertical finned installation and support means positioned at a downwardly extending angle to said top flange, wherein said top edge extends at an angle of about 10°–45° from the horizontal down from a welded point underneath said top flange and toward the side of said finned vanes extending radially outward from said container base;

(e) a bottom surface covering the bottom end on said cylindrical container base;

(f) a bottom edge on said finned vanes extending radially outward from said container base positioned at a penetrating angle of at least about 40° from the horizontal to said bottom surface for penetrating earthen or asphalt material when pushed downwardly; and (g) wherein said junction box is reusable by removal and reinstallation at another location.

* * * * *